July 20, 1943.  J. P. BUTTERFIELD  2,324,676
BEARING
Filed June 6, 1941
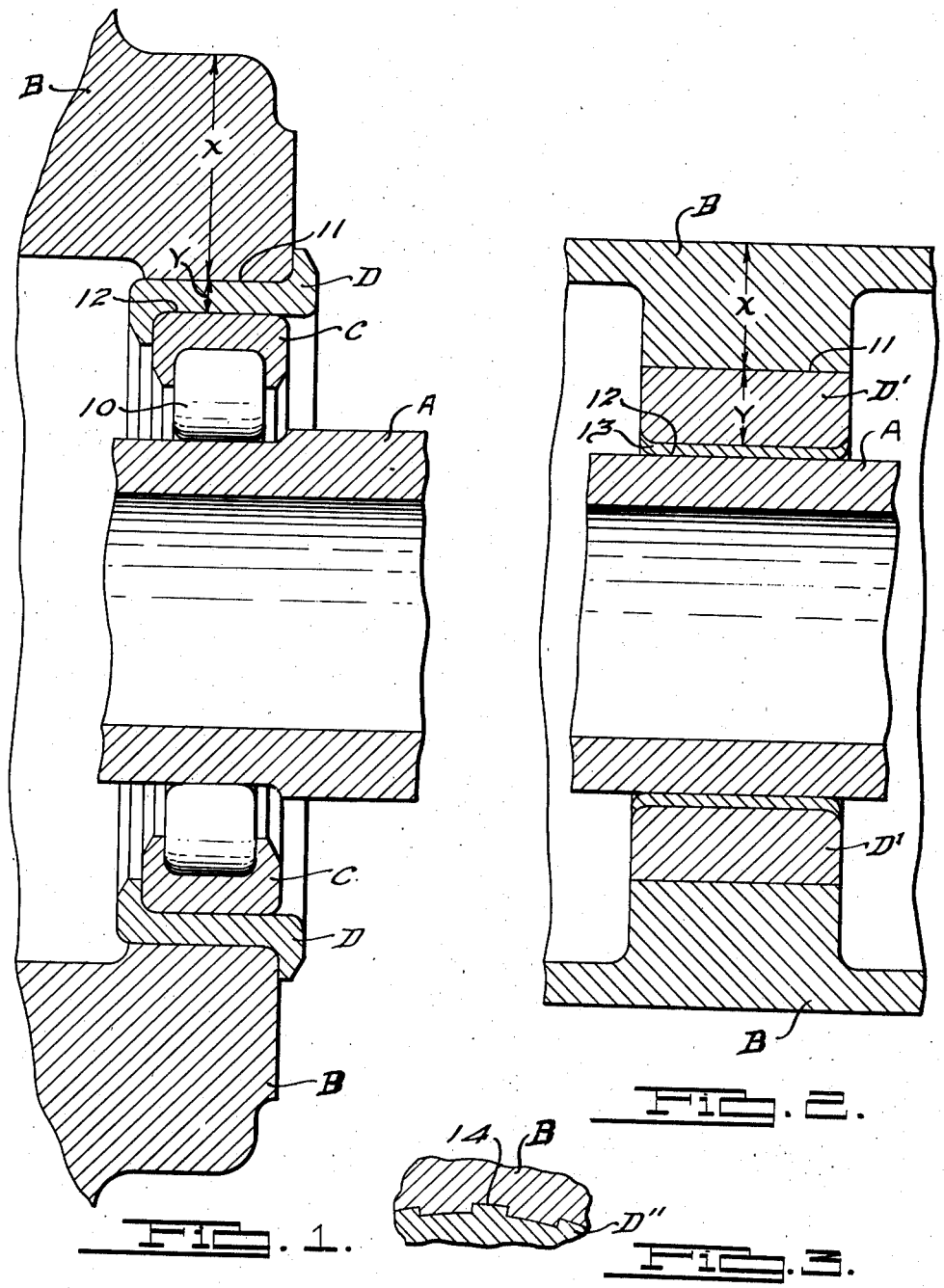
INVENTOR
John P. Butterfield.
BY
Harness, Dick, Pattie & Harris
ATTORNEYS.

Patented July 20, 1943

2,324,676

UNITED STATES PATENT OFFICE 2,324,676

BEARING

John P. Butterfield, Detroit, Mich., assignor to Chrysler Corporation, Highland Park, Mich., a corporation of Delaware Application June 6, 1941, Serial No. 396,792

10 Claims. (Cl. 308—23).

This invention relates to bearings and refers especially to improvements in bearing assemblies subjected to load under varying temperature conditions, such as in internal combustion engines for example.

One important use of my bearing is in connection with journalling the crankshaft of aircraft engines. In engines of this type it is desirable to employ a case of a material of light weight such as aluminum or magnesium alloy, or other suitable non-ferrous material. In practice it has been found that with such arrangements the clearances in the bearing assemblies objectionably increase owing to the relatively great coefficient of expansion of the aluminum with respect to that of the other parts of the bearing. Therefore as the engine temperature increases, the increasing bearing clearance results in the crankshaft pounding and vibrating thereby tending to destroy the bearing and, especially in the instance of a radial engine, to introduce a destructive whirling vibration in the aircraft propeller.

It is accordingly an object of my invention to provide a bearing and method in which the clearance will be controlled as desired, under varying temperature conditions, thereby increasing the life and capacity of the bearing, minimizing or eliminating propeller whirl and crankshaft pounding, and increasing the life of the aircraft power plant and propeller assembly.

In conventional practice, where the bearing is of the roller or ball type, it is customary to interpose a sleeve or liner between the cup and the case. Heretofore the sleeve and cup were made of steel and the case of aluminum, the sleeve having a press fit in the case. With the parts assembled to provide the desired clearance between the sleeve and cup when the engine is "cold," this clearance becomes excessive when the engine reaches normal operating temperature owing to the relatively large coefficient of expansion of aluminum with respect to that of steel. In an attempt to remedy the difficulty, the case is sometimes made of steel but this obviously sacrifices the desired low weight of the power plant and is therefore very undesirable.

In carrying out my invention, I form the case of the desired light weight non-ferrous alloy such as aluminum or magnesium and the sleeve of a material having a coefficient of expansion substantially less than that of the case and steel cup. As an example of a suitable material for the sleeve, I preferably employ Invar which is an alloy well known and is commercially used in controlling expansion of aluminum pistons. By choosing the proper thickness of the Invar sleeve for a given case thickness, and a press of the sleeve in the case such that the sleeve will remain tight in the case over a given temperature range, the clearance between the cup and sleeve may be made to remain constant over such range or to vary as may be desired. By preference, the Invar sleeve thickness is chosen such that the combined case and sleeve will provide an expansion substantially equal to that of the steel cup whereby the clearance will remain approximately constant.

In order to illustrate specific examples of my invention reference is made to the accompanying drawing in which:

Fig. 1 is a sectional elevational view through a typical bearing assembly of the anti-friction type embodying my invention.

Fig. 2 is a similar view illustrating a plain type of bearing.

Fig. 3 is a fragmentary view illustrating a further modified bearing structure.

In the drawing I have shown a portion of an aircraft engine having a steel crankshaft A and light weight case B of aluminum or magnesium for example. The crankshaft A is journalled in the case B by rollers 10 having the usual steel cup or ring C fitting within a supporting sleeve or liner D of Invar or equivalent and having a press fit in the opening 11 of the case. The amount of press of sleeve D in opening 11 is preferably such that the sleeve will remain tight in the case over the temperature range dealt with.

The critical clearance which is controlled by reason of my invention is that at 12 between the sleeve D and cup C. This clearance is, of course, very small and no attempt is made to illustrate it in the drawing.

The coefficients of expansion of aluminum, steel, and Invar are respectively approximately 12, 7 and 0.6 times a constant of $10^{-6}$ from which it will be apparent that the clearance at 12 may be controlled as desired over a given temperature range by choosing a proper relationship between the thickness Y of the sleeve D adjacent the case opening 11, the press at 11 retaining sleeve D tight.

The change in clearance at 12 between the sleeve inside diameter and the cup outside diameter is, in general, per inch diameter of the following dimension:

$$T\left(\frac{(K^1-K^2)}{\left(\frac{1}{E^1}+\frac{Y}{XE^2}\right)E^1}+(K^2-K^3)\right)$$

where

T is the temperature difference in degrees Fahrenheit between "hot" and "cold" conditions of the bearing assembly,
$K^1$ is the coefficient of linear expansion of case B,
$K^2$ is the coefficient of linear expansion of sleeve D,
$K^3$ is the coefficient of linear expansion of cup C in Fig. 1 or shaft A in Fig. 2,
$E^1$ is the modulus of elasticity of the sleeve D,
$E^2$ is the modulus of elasticity of the case B, and
X and Y are respectively the thickness of case B and sleeve D as aforesaid.

From the foregoing relationship it will be apparent that it is possible to make the change in clearance zero or to assign to it any value desired between limits permitted by choice of material by choosing the relationship of Y/X according to the above expression. If it is desired to maintain the clearance at 12 approximately constant over the temperature range, then values may be assigned to X and Y such that the foregoing expression will equal zero or approximately zero inasmuch as the limit of accuracy of the various factors in the expression and the engineering requirements are such that it is not necessary that an absolute mathematical accuracy be preserved. For example, the thickness X of case A will in many instances be such that only an approximation of this dimension will be possible or necessary. This value will be assigned with due regard to fillets, webs, wall thickness variation so that an effective rigidity value may be assigned to X under given conditions. Obviously, if the judgement of the calculator is in error in this respect, then by trial suitable correction may be made.

In Fig. 2 I have illustrated the principles of my invention applied to a plain bearing in which the Invar sleeve D' is now coated with suitable bearing material 13 engaging the steel crankshaft A which now takes the place of cup C in the foregoing analysis. The same press at 11 is maintained as before and the critical clearance 12 is controlled according to the aforesaid relationships substituting shaft A for cup C. In each of Figs. 1 and 2 the steel members (C or A in Fig. 1, A in Fig. 2) are concentrically disposed within the Invar sleeve (D in Fig. 1, D¹ in Fig. 2) for control of clearance 12 and for support in case B against lateral displacement.

It will be understood that the particular alloys referred to in my specification and claims such as steel, aluminum or magnesium, and Invar, are cited by way of illustration as they are representative of classes of materials having desired physical characteristics within the objects of my invention and, if desired, other equivalent materials may be used. The effective coefficient of expansion of the combined case and sleeve is substantially equal to that of the steel member C in Fig. 1 or A in Fig. 2 where it is desired to maintain clearance 12 substantially constant over the temperature range.

If desired, the sleeve D or D¹ may be embedded in an opening of case B during casting of the aluminum case as will be readily understood. Such arrangement is illustrated in Fig. 3. In casting the aluminum case B with the Invar sleeve D'', this sleeve will be held tightly in position owing to the shrink of the aluminum. The sleeve serrations 14 may be provided to further guard against undesired displacement of the sleeve, especially in a circumferential direction. The Fig. 3 arrangement may be employed in either of the bearing arrangements shown in Fig. 1 or 2.

I claim:

1. A bearing comprising a case having an opening fitted with a sleeve so as to remain tight in the case over a substantial temperature change to which the bearing is subjected, a member disposed with clearance within the sleeve and arranged in load transferring relationship with respect to the sleeve and case, the case and the member having relatively different coefficients of expansion, the sleeve having a cofficient of expansion differing from that of the case and member, and the radial effective thicknesses of the case and sleeve adjacent said opening being of such relative values in relation with each other and in relation with the coefficients of expansion of said case, member, and sleeve, so as to control undesired variation of said clearance within said range of temperature change.

2. A bearing comprising a case having an opening fitted with a sleeve so as to remain tight in the case over a substantial temperature change to which the bearing is subjected, a member disposed with clearance within the sleeve and arranged in load transferring relationship with respect to the sleeve and case, the case and the member having relatively different coefficients of expansion, the sleeve having a coefficient of expansion differing from that of the case and member and being of such relative values that the effective coefficient of expansion of the combined case and sleeve bears such relationship to the coefficient of expansion of the member that said clearance remains substantially constant within said range of temperature change.

3. A bearing comprising a case having an opening fitted with a sleeve so as to remain tight in the case over a range of substantial temperature change T to which the bearing is subjected, a member disposed with clearance within the sleeve and arranged in load transferring relationship with respect to the sleeve and case, the coefficient of linear expansion $K^1$ of the case being substantially greater than that $K^3$ of the member, the sleeve having a coefficient of linear expansion $K^2$ substantially less than that of the case and member, and the radial effective thicknesses of the case and sleeve (X and Y respectively) adjacent said opening being of such relative values, so as to control variation of said clearance per inch of diameter of the member and within said temperature range T according to the following expression:

$$T\left(\frac{(K^1-K^2)}{\left(\frac{1}{E^1}+\frac{Y}{XE^2}\right)E^1}+(K^2-K^3)\right)$$

wherein $E^1$ and $E^2$ are respectively the moduli of elasticity of the sleeve and case.

4. A bearing comprising a case having an opening fitted with a sleeve so as to remain tight in the case over a substantial temperature change to which the bearing is subjected, a member disposed with clearance within the sleeve and arranged in load transferring relationship with respect to the sleeve and case, the coefficient of linear expansion of the case being substantially greater than that of the member, the sleeve having a coefficient of linear expansion substantially less than that of the member and being of such relative values that the effective coefficient of linear expansion of the combined case and sleeve bears such relationship to the coefficient of linear expansion of the member that said clearance remains substantially constant within said range of temperature change.

5. A bearing comprising a case having an opening fitted with a sleeve so as to remain tight in the case over a substantial temperature change to which the bearing is subjected, a member disposed with clearance within the sleeve and arranged in load transferring relationship with respect to the sleeve and case, the case being formed of material of weight relatively light with respect to the weight of the material of which the sleeve and member are formed, the case material having a coefficient of linear expansion relatively large with respect to that of the sleeve material and member material, the sleeve material having a coefficient of linear expansion relatively small with respect to that of the member material, and the radial effective thicknesses of the case and sleeve adjacent said opening being of such relative values, so as to control undesired variation of said clearance within said range of temperature change.

6. A bearing of the character described comprising an aluminum case having an opening fitted with an Invar sleeve, and a steel member disposed with clearance within said sleeve and arranged in load transferring relationship with respect to the sleeve and case.

7. A bearing of the character described comprising an aluminum case having an opening fitted with an Invar sleeve so as to remain tight in the case over a substantial temperature change to which the bearing is subjected, and a steel member disposed with clearance within the sleeve and arranged in load transferring relationship with respect to the sleeve and case, the radial effective thicknesses of the case and sleeve adjacent said opening being such that said clearance remains approximately constant over said temperature range.

8. A bearing for journalling a steel crankshaft of an engine in an aluminum case, an Invar sleeve fitted within said case so as to remain tight therewith over the temperature range incident to operation of the engine, anti-friction bearing elements journalling the crankshaft, and a steel cup for said elements, said cup fitting with clearance within said sleeve.

9. The method in a bearing assembly of controlling clearance between a case-carried sleeve and a member disposed therein in load transferring relation therewith over a substantial range of temperature change, comprising, forming the sleeve of a material having a predetermined coefficient of linear expansion substantially less than that of said case and said member, and providing said case and sleeve with predetermined radial thicknesses in regions thereof adjacent said clearance, such that the effect on said clearance of expansion and contraction of the case and member over said range of temperature change is modified and controlled by said sleeve.

10. The method in a bearing assembly of controlling clearance between a case-fixed sleeve and a member disposed therein in load transferring relation therewith over a substantial temperature range T, comprising, forming the sleeve of a material having such less coefficient of linear expansion $K^2$ than that $K^1$ of the case and that $K^3$ of the member and of such modulus of elasticity $E^1$ relative to that $E^2$ of the case, and providing the case and sleeve with such radial thicknesses (X and Y respectively) in regions thereof adjacent said clearance, so that variation of said clearance per inch of diameter of the member at said clearance will be substantially in accordance with the expression:

$$T\left(\frac{(K^1-K^2)}{\left(\frac{1}{E^1}+\frac{Y}{XE^2}\right)E^1}+(K^2-K^3)\right)$$

JOHN P. BUTTERFIELD.